US012798191B2

(12) United States Patent
Oleske

(10) Patent No.: US 12,798,191 B2
(45) Date of Patent: Nov. 17, 2026

(54) SYSTEM AND PROCESS FOR THE ADDITIVE MANUFACTURING OF RF TUNABLE MATERIALS

(71) Applicant: The Charles Stark Draper Laboratory, Inc., Cambridge, MA (US)

(72) Inventor: Katharine Wanda Oleske, Cambridge, MA (US)

(73) Assignee: The Charles Stark Draper Laboratory, Inc., Cambridge, MA (US)

( * ) Notice: Subject to any disclaimer, the term of this patent is extended or adjusted under 35 U.S.C. 154(b) by 22 days.

(21) Appl. No.: 18/826,843

(22) Filed: Sep. 6, 2024

(65) Prior Publication Data

US 2025/0073987 A1 Mar. 6, 2025

Related U.S. Application Data

(60) Provisional application No. 63/580,749, filed on Sep. 6, 2023.

(51) Int. Cl.

| | |
|---|---|
| ***B29C 64/336*** | (2017.01) |
| ***B29K 105/16*** | (2006.01) |
| ***B29L 31/34*** | (2006.01) |
| ***B33Y 10/00*** | (2015.01) |
| ***B33Y 30/00*** | (2015.01) |
| ***B33Y 70/10*** | (2020.01) |
| ***B33Y 80/00*** | (2015.01) |

(52) U.S. Cl.

CPC ............ *B29C 64/336* (2017.08); *B33Y 10/00* (2014.12); *B33Y 30/00* (2014.12); *B33Y 70/10* (2020.01); *B33Y 80/00* (2014.12); *B29K 2105/16* (2013.01); *B29K 2995/0008* (2013.01); *B29K 2995/0094* (2013.01); *B29L 2031/3456* (2013.01)

(58) Field of Classification Search

CPC ..... B29C 64/118; B29C 64/30; B29C 64/106; B29C 64/336; B33Y 10/00; B33Y 30/00; B33Y 80/00; B33Y 40/00; B33Y 70/10; H01Q 1/50; B29K 2105/16; B29K 2995/0008; B29K 2995/0094; B29L 2031/3456

See application file for complete search history.

(56) References Cited

U.S. PATENT DOCUMENTS 5,691,846 A * 11/1997 Benson, Jr. ........... B29C 59/046 359/530

8,320,727 B1 * 11/2012 Jacobsen ................ G02B 6/138 264/1.24

(Continued)

*Primary Examiner* — Ab Salam Alkassim, Jr.

(74) *Attorney, Agent, or Firm* — Daly, Crowley, Mofford & Durkee, LLP

(57) ABSTRACT

Radio frequency (RF) tunable materials which are readily compatible with additive manufacturing techniques, such as 3D printing technologies, are provided. RF tunable materials are used to form an RF device that operates over a wide range of frequencies. The RF device is formed by interpenetrating structures of one or more composite materials. One or more curing methods are applied to the structures. The composite materials include performance materials and are be used to fabricate RF devices including RF antennas, RF horn antennas, graded index devices.

13 Claims, 10 Drawing Sheets
(2 of 10 Drawing Sheet(s) Filed in Color)

(56) References Cited

U.S. PATENT DOCUMENTS

| | | | | |
|---|---|---|---|---|
| 2012/0288627 | A1* | 11/2012 | Hodges, Jr. | H01Q 1/38 118/704 |
| 2014/0316073 | A1* | 10/2014 | Locke | C08G 18/7671 568/69 |
| 2017/0009090 | A1* | 1/2017 | Haghzadeh | H05K 1/16 |
| 2018/0053603 | A1* | 2/2018 | Al-Hazmi | H01G 4/206 |
| 2019/0374309 | A1* | 12/2019 | Parkar | B33Y 50/02 |
| 2020/0037451 | A1* | 1/2020 | Elimelech | H05K 1/095 |
| 2021/0316501 | A1* | 10/2021 | Boyce | B22F 3/1115 |
| 2022/0334291 | A1* | 10/2022 | Deore | G02B 3/0087 |
| 2023/0122929 | A1* | 4/2023 | Vella | B29C 64/118 264/401 |
| 2026/0054448 | A1* | 2/2026 | Cristiani | B29C 64/129 |

* cited by examiner

SYSTEM AND PROCESS FOR THE ADDITIVE MANUFACTURING OF RF TUNABLE MATERIALS

CROSS REFERENCE TO RELATED APPLICATIONS

This application claims priority to U.S. Provisional Patent Application Ser. No. 63/580,749 filed on Sep. 6, 2023, the entire content of which is hereby incorporated by reference herein.

FIELD OF TECHNOLOGY

The described technology generally relates to radio frequency (RF) tunable materials, more particularly to RF devices formed using additive manufacturing.

BACKGROUND

Tunable RF materials and structures enable antennas to operate over a relatively large frequency range. Two-dimensional (2D) printing or assembly of materials may be used to fabricate antennas having a narrow range of operating frequencies. 2D printing and material assembly techniques, however, often result in antennas that fail to or struggle to meet desired RF requirements. This is due, at least in part, to the waveforms' need to penetrate multiple millimeters or centimeters into structures depending upon the frequency range, which these 2D technologies often cannot accommodate.

Additive manufacturing techniques may utilize three-dimensional (3D) fabrication techniques to produce 3D structures. One such additive manufacturing technique is 3D printing, wherein a structure is formed through the printing of successive layers of a material. The use of 3D printing techniques is often limited by the unit cell size, structure size within the unit cell, and the ability to fabricate performance materials into microscale to centimeter scale structures over a large area (e.g., on the order of square feet).

RF tunable materials are not readily compatible with known 3D printing techniques. Conventional 3D printing techniques often utilize ultraviolet (UV) curing or laser curing of a resin in order to set the initial structure. The need for such UV curing prevents so-called "performance materials" from being included or loaded into the 3D printer, including for example, RF tunable materials having a concentration which is sufficient (i.e., high enough) to produce tunable structures. Curing of performance materials, which are dark and tend to absorb the light, limit the penetration depth of the curing light.

SUMMARY

According to one or more aspects, described herein are radio frequency (RF) tunable materials that may be used to form an RF device that can operate over a wide range of frequencies. The RF tunable materials are readily compatible with additive manufacturing technologies, such as 3D printing. Such RF tunable materials may comprise performance materials and may be used to fabricate RF devices including RF antennas, RF horn antennas, graded index devices and/or the like.

According to one aspect, an RF device may include a first network structure comprising a first composite. The first composite may include a first RF tunable material. A second network structure may interpenetrate the first network structure. The second network structure may include a second composite including a second RF tunable material. The first and second network structures may be sized and positioned to control an RF tuning ability.

The RF device may include, alone or in combination, one or more of the following features. The first RF tunable material may be the same as the second RF tunable material. The first structure and the second structure may be equally sized and shaped. The first structure and the second structure each may comprise gyroids. The first and second structures may form a double gyroid lattice. The first and second RF tunable materials may include one or more of: one or more performance materials; one or more additional additives; and one or more spacing materials. The one or more performance materials may include one or more of a ferroelectric additive, a ferromagnetic additive, a liquid crystal additive, a phase change additive, an elastic additive, a semiconductor material, and/or a semiconductor component. The one or more performance materials may further include one or more of barium strontium titanite (BST), yttrium iron garnet, gallium antimony tellurium (Ga—Sb—Te), and vanadium dioxide. The one or more additional additives may include one or more of titanium dioxide, zinc oxide, oxides, nitrates, and nitrides. The one or more additional additives may be sized between about 1 nanometer (nm) and 20 micrometers (μm). The one or more spacing materials may include one of a magnetostrictive material and a piezoelectric material. The spacing material may be positioned to modify a geometric shape of the RF device. A spacing between the first network structure and the second network structure may be provided by an actuator.

According to another aspect, a method of providing an RF tunable material may include forming one or more performance materials, forming a composite, comprising one or more performance materials, a resin, and an initiator; degassing the composite; and extruding the composite through an additive manufacturing technique to form an RF tunable structure including a first network and a second network interpenetrating the first network.

The method may include, alone or in combination, one or more of the following features. One or more additional additives may be added into the composite. One or more spacing materials may be mixed into the composite. The composite may be formed to include about 30% of the one or more performance materials, about 69% of the resin, and about 1% of the initiator.

According to another aspect, a system for providing an RF tunable device may include a 3D printer chamber having a cavity and at least one nozzle positioned inside the cavity. The at least one nozzle may be configured to receive a first composite and a second composite. A platform may receive a structure from the nozzle. At least one curing device may be provided. A controller may be configured to extrude the first composite and the second composite from the nozzle to form the structure comprising interpenetrating networks of the first composite and the second composite.

The system may include, alone or in combination, one or more of the following features. The at least one curing device may include one or more of a cure resin, an initiator, a thermal cure, a humidity cure, a light cure, an ultraviolet frequency cure, a radiation cure, a voltage application cure, a microwave cure, and an anaerobic cure. The at least one curing device may be provided in an enclosure, wherein the enclosure is smaller than the cavity. The at least one curing device may include a first cure device positioned along the cavity and a second cure device positioned along a portion of the cavity.

DESCRIPTION OF THE SEVERAL VIEWS OF THE DRAWINGS

The patent or application file contains at least one drawing executed in color. Copies of this patent or patent application publication with color drawing(s) will be provided by the Office upon request and payment of the necessary fee.

The manner and process of making and using the disclosed embodiments may be appreciated by reference to the figures of the accompanying drawings. It should be appreciated that the components and structures illustrated in the figures are not necessarily to scale, emphasis instead being placed upon illustrating the principals of the concepts described herein. Like reference numerals designate corresponding parts throughout the different views. Furthermore, embodiments are illustrated by way of example and not limitation in the figures, in which.

DETAILED DESCRIPTION

Before describing the concepts sought to be protected herein, it should be appreciated that although reference is sometimes made herein to certain types of radio frequency (RF) devices such as three-dimensional (3D) printed antennas, those of ordinary skill in the art will appreciate the concepts, system, materials and techniques described herein find use with a wide range different RF devices including, but not limited to any complex multi-layer RF circuits, RF baluns, RF couplers, inductors, capacitors, waveguides and filters. References herein to any specific RF devices, frequency ranges, sizes, or shapes are made solely to promote clarity in the broad concepts sought to be protected and are not intended to be, and should not be, construed as limiting.

In accordance with one aspect of the concepts disclosed herein, described are RF tunable materials that may be used to form an RF device that can operate over a wide range of frequencies. The RF tunable materials are readily compatible with additive manufacturing technologies, such as 3D printing. Such RF tunable materials may comprise performance materials and may be used to fabricate RF devices. RF devices may include, but are not limited to, RF antennas, RF horn antennas, and/or graded index devices.

With this particular arrangement, the systems and techniques described herein enable fabrication of small unit cells (e.g., on the order of microns) and structures over a large area. The concepts, systems and techniques described herein, may be used to fabricate 3D structures (e.g., 3D printing techniques) and the operating frequency of structures can be tuned over a wide range of frequencies. These materials and structures are also compatible with secondary stack-ups and patterning that may further enable the tunability of an antenna with an applied magnetic field, electric field, voltage, thermal load, bias (current), mechanical load, or the like. The structures may be further tuned by applying spacing between the multiple structures described herein, including without limitation, spacing materials and/or by actuators engaged during the printing process.

Figure 1B:
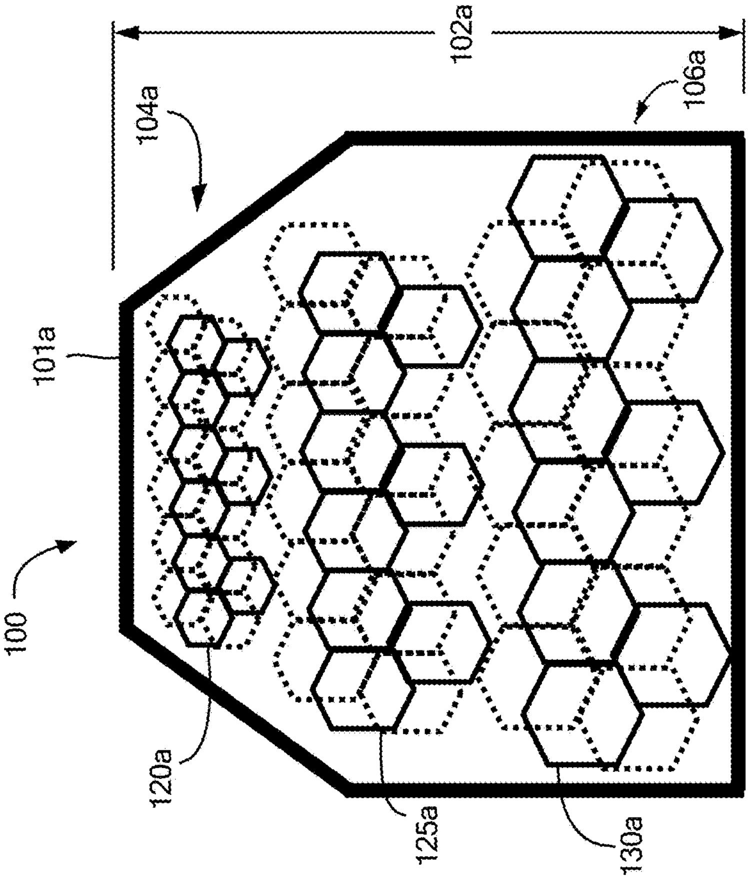
FIG. 1B is a block diagram of another example an RF device having a second shape, according to one or more aspects of the present disclosure.
Figure 1A:
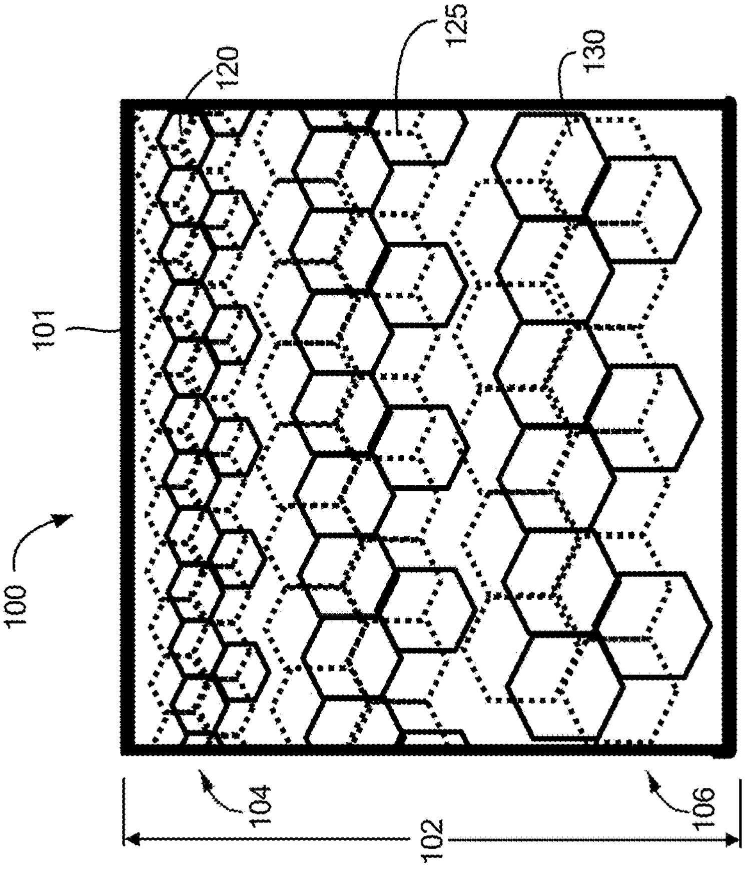
FIG. 1A is a block diagram of an example radio frequency (RF) device formed from RF tunable structures, according to one or more aspects of the present disclosure.

Referring now to FIG. 1A, an example RF device 100 may include a plurality of structures with the structures increasing in size from a first size (illustrated by structures labelled with reference numeral 120) to a second different size (illustrated by structures labelled with reference numeral 125) to further yet a third size (illustrated by structures labeled with reference numeral 130). The RF device 100 may have a particular first shape 101. The RF device 100 may include one or more small structures 120 positioned along a first side 104 (or upper side) and one or more large structures 130 positioned along a second side 106 (or lower side) of device 100, with medium-sized structures 125 disposed therebetween. Thus, in the example embodiment of FIG. 1A, the size of the structures increases from a first portion (here the first side 104) of RF device 100 to a second portion (here, the opposing lower end 106) of the RF device 100. Thus, it can be said there exists a gradient in the size of the structures in device 100 (illustrated by the arrow labeled 102).

Referring now to FIG. 1B, the geometric shape of the RF device 100 may be modified (or changed) form a first shape 101 (e.g., as shown in FIG. 1A) to a second shape 101*a* (e.g., as shown in FIG. 1B) by application of one or more signals such as electrical signals, magnetic signals, RF signals, thermal responses, mechanical responses, digital signals, or the like to the RF device 100. For example, as shown in the exemplary RF device 100 of FIG. 1B, application of the one or more signals may results in a constriction or tighter arrangement of the small structures 120*a* at the first side 104*a*, decreasing the width at that portion of the RF device 100. The particular shapes which the RF device 100 may take on can be modified through the use and placement of the performance materials, such as the elastic additives, phase change materials, and spacing materials, as described herein. Additionally, the shape of the device 100 may be altered or modified using magnetostrictive and/or piezoelectric materials, electrostrictive materials, and/or other mechanical actuation to control spacing in and around the structures 120*a*, 125*a*, 130*a*.

Referring now to both FIG. 1A and FIG. 1B, in order to form the RF device 100, a combination of performance materials, additional additives, spacing materials, and cure devices or methods may be used. To cover a desired wide frequency range, the characteristics of the tunable material that makes up the RF device 100, the geometric shape of the RF device 100 itself, and the internal structure of the RF device 100 may be modified. Different amounts of the performance materials, additional additives, and spacing materials may be used and positioned within and along the RF device in order to achieve target characteristics. Different performance materials, additional additives, spacing materials, and/or mechanical actuation may be used to enable different RF tuning abilities. The RF device 100 may for example, be any type of RF antenna including, but not limited to any type of 3D printed circuit antenna (e.g., a patch antenna). The RF device 100 may also or instead be a lens, or a dielectric resonator suitable for use in a wide range of applications including, but not limited to remote sensing, satellite communications, wireless communications, global positioning systems (GPS), and radar.

As stated above, a gradient in the size of the structures in the RF device 100 may be formed along a height 102, 102*a* of the RF device 100. A gradient of structures may be formed as the quantity of structures decreases and the size of the structures increases along a height 102, 102*a* from the first side 104, 104*a* to the second side 106, 106*a* of the RF device 100. As illustrated in FIG. 1B, the RF device 100 having shape 101*a* may include one or more small structures 120*a* positioned along a first side 104*a*, one or more larger structures 130*a* positioned along a second side 106*a* and, one or more mid-sized structures 125*a* therebetween.

A gradient of structures may be formed as the quantity of structures decreases and the size of the structures increases along a height 102*a*, from the first side 104*a* to the second side 106*a*, of the RF device 100. In alternative embodiments, the structures may be on opposing sides of the RF device 100 so the smaller structures 120, 120*a* are positioned on the second side 106, 106*a* and the larger structures 130, 130*a* are positioned along the first side 104, 104*a*, with the gradient of structures increasing from the second side 106, 106*a* to the first side 104, 104*a*. In addition to the size gradient, structures throughout device 100 (e.g., structures 120, 125, 130) may be provided using different performance materials, additional additives, spacing materials, mechanical actuation and/or varying structure shapes (e.g., pyramid structures, fractal structures, periodic cones, or the like).

For example, as shown in FIG. 1A and FIG. 1B, the larger structures 130, 130*a*, which may be formed from certain performance materials, described below, may be positioned along the second side 106, 106*a* of the RF device 100 and are used to enable scanning of lower frequencies. Smaller structures 120, 120*a*, which may be formed from certain other performance materials, described below, may be positioned along the first side 104, 104*a* of the RF device 100, enabling scanning at higher frequencies.

One skilled in the art will appreciate the designation of the "first" and "second" sides and "increasing" or "decreasing" sizes and quantities are not temporal or ordered limitations. As described herein, the formation of the RF devices using additive manufacturing techniques may result in forming the RF device 100 from the "bottom-up." Accordingly, the structures on the second side 106, 106*a*, of the RF device 100 may be formed prior to the structures on the first side 104, 104*a*. The use of the terms "first" and "second" sides and "increasing" or "decreasing," therefore, is merely for identification and clarity of explanation.

According to aspects of the present disclosure the RF device 100 and the structures forming the RF device 100 may be formed by additive manufacturing techniques (e.g. 3D printing) using one or more composite materials (e.g., printable inks). Such composite materials may be designed and configured according to the specification of a desired tunability of the RF device to be formed, using a number of ingredients including performance materials, additional additives and spacing materials.

According to one or more aspects of the present disclosure, one or more performance materials may be used to enhance permeability. Performance materials, as used herein may include materials stimulus-responsive materials that change key material properties of the material as a function of stimulus (e.g., the dielectric constant or permeability of the material changes as a function of voltage). The addition of such materials may enhance and/or enable lower loadings of ferroelectric additives, ferromagnetic additives, elastic additives, phase change materials, and spacing materials. The addition of performance materials may also enhance and/or change the dielectric material's permeability and/or other key properties to enable wide range tunablility and enable higher loadings of resin or other cure enabling materials for additive manufacturing compatibility. According to one aspect, the performance materials may have a higher RF response and allow for more resin.

According to one aspect, a polymer binder also can play a role in RF tunability. Altering the polymer chemistry may adjust the dielectric tangent, dielectric loss, flexibility, additive loading, and feature sizes that can be obtained per each layer of the structure. Needs of varying dielectric tangents and loss across the printed unit cells may enable high fidelity RF metamaterials. Rigid polymer-based materials such as, for example, Teflon, PVDF, and silicates, may accomplish significantly lower dielectric loss and dielectric constants than traditional 3D printable polymers. This dielectric loss may be relevant when developing high frequency antennas where any degree of loss becomes problematic for high performance antennas. Additionally, in 3D printing flexible layers or fully flexible antennas cyclic olefin co-polymers, and styrene-isoprene-styrene block co-polymers may be used. Such materials may still have low dielectric loss constants but may enable significant flexibility of end parts. Adjusting the flexibility of these polymers may also enable unique RF performance and applications. Adjustments of modulus can be conducted with unique filler loading. With flexible polymers, high volumetric loading of functional additives, which can decrease the flexibility while simultaneously adjusting the dielectric constant of the printed structure. High degrees of volumetric loading may be introduced with dispersant additives. These additives may be generally low molecular weight polymers or oligomers which may help separate ceramic, metal, and polymer additives which may vary in shape or geometry into homogenous distributions through the filament. Accordingly, this may allow for a concentration of material which is high enough to produce an RF tunable structure without requiring a higher loading of the performance material.

According to one aspect, performance materials may include, but are not limited to: ferroelectric additives, ferromagnetic additives, liquid crystal additives, phase change additives, elastic additives, semiconductor materials, and/or semiconductor components that may change the dielectric material property, the material's permeability, and/or the material's electromagnetic response. Example performance materials may include: barium strontium titanite (BST), yttrium iron garnet, gallium antimony tellurium (Ga—Sb—

Te), and vanadium dioxide. Ferromagnetic materials may be used to enable such scanning specifications or an electromagnetic response, as described above. The phase change additives may be used to modify the geometric shape of the RF device 100 in response to thermal activation and/or to change the electromagnetic response, enabling RF tuneability. Elastic additives may be used to modify the geometric shape of the RF device 100 in response to stretching or other physical manipulation. Semiconductor components and materials may enable further tuning, for example, incorporation of varactor diodes may enable further tuning at MHz or GHz frequencies. Additionally, mechanical actuation may be used to further change the RF tunability by macroscopically changing structure.

According to one aspect, one or more additional additives, as described herein, may be used to enhance the UV scattering of material, boost a curing method, boost a modulus or dielectric response, boost the material's permeability capabilities as described above, and/or be a space controlling material. Additional additives, as used herein may include additives or materials that may allow for more performance materials to be loaded through more UV scattering and alternative cures rather than the UV light being absorbed by the dark particles. The additional additives may include, but are not limited to, titanium dioxide, zinc oxide, oxides, nitrates, and/or nitrides.

According to one aspect, the additional additives may be functional groups added to the performance materials. UV scattering functional groups may be attached to the performance materials, for example through a UV scattering functional group (e.g., nitrate) in the same molecule as an attachment group that is selectively reactive to the surface of the performance material (e.g., silane). The attachment group may react to the surface of the performance material particle (e.g., ferroelectric material), leaving the UV scattering functional group around the particle to scatter the UV light and UV cure the resin, preventing the UV light from being absorbed into the performance material.

In embodiments, the quality and size of the additional additives may be selected and/or adjusted to curate a desired level of scattering of UV light to help with curing the 3D printed RF device. According to one aspect, the size and shape of the additional additives may be provided having a largest dimension in the range between about 1 nanometer (nm) (+/−0.5 nm) to about 20 micrometer (μm) (+/−2 μm). In embodiments, the additional additives may have any geometric shape (either regular or irregular geometric shape). In embodiments, the additional additives may be shaped having an aspect ratio of about 14:1. In other embodiments, the additional additives may be shaped having an aspect ratio of about 12:1, 10:1, 8:1, or 6:1. Other aspect ratios may, of course, also be used. Based on the disclosure provided herein, one of ordinary skill in the art will appreciate how to select the size, shape and/or aspect ratio of the additional additives.

One or more spacing materials may be used to control the spacing. According to one aspect, the spacing materials may include but are not limited to magnetostrictive materials and/or piezoelectric materials. In addition to magnetostrictive and/or piezoelectric materials, electrostrictive materials may be used to control spacing. Spacing may also be controlled by mechanical actuators or by changes driven by a coefficient of thermal expansion due to a thermal input. Spacing may further yet be controlled by electrically driven actuation in dielectric elastomer actuators, ionic polymer/metal composites, and liquid crystal elastomers. Mechanical actuation may also or instead be employed after printing to manipulate spacing.

These spacing materials may or may not be used in the RF device composite. In addition to or instead of being used in the composite, the spacing materials may be layered between the structures formed by the RF device composite material. These spacing materials may be used to modify the geometric shape of the RF device through the application of an applied magnetic or electrical field. Alternatively, the spacing materials may cause the structure to tilt the resonant conducting elements in order to alter the material response. Alternatively, or additionally, as described herein, macroscopic actuation by mechanical actuators may be employed to control, adjust or otherwise manipulate the spacing in and around the structures.

Figure 2A:
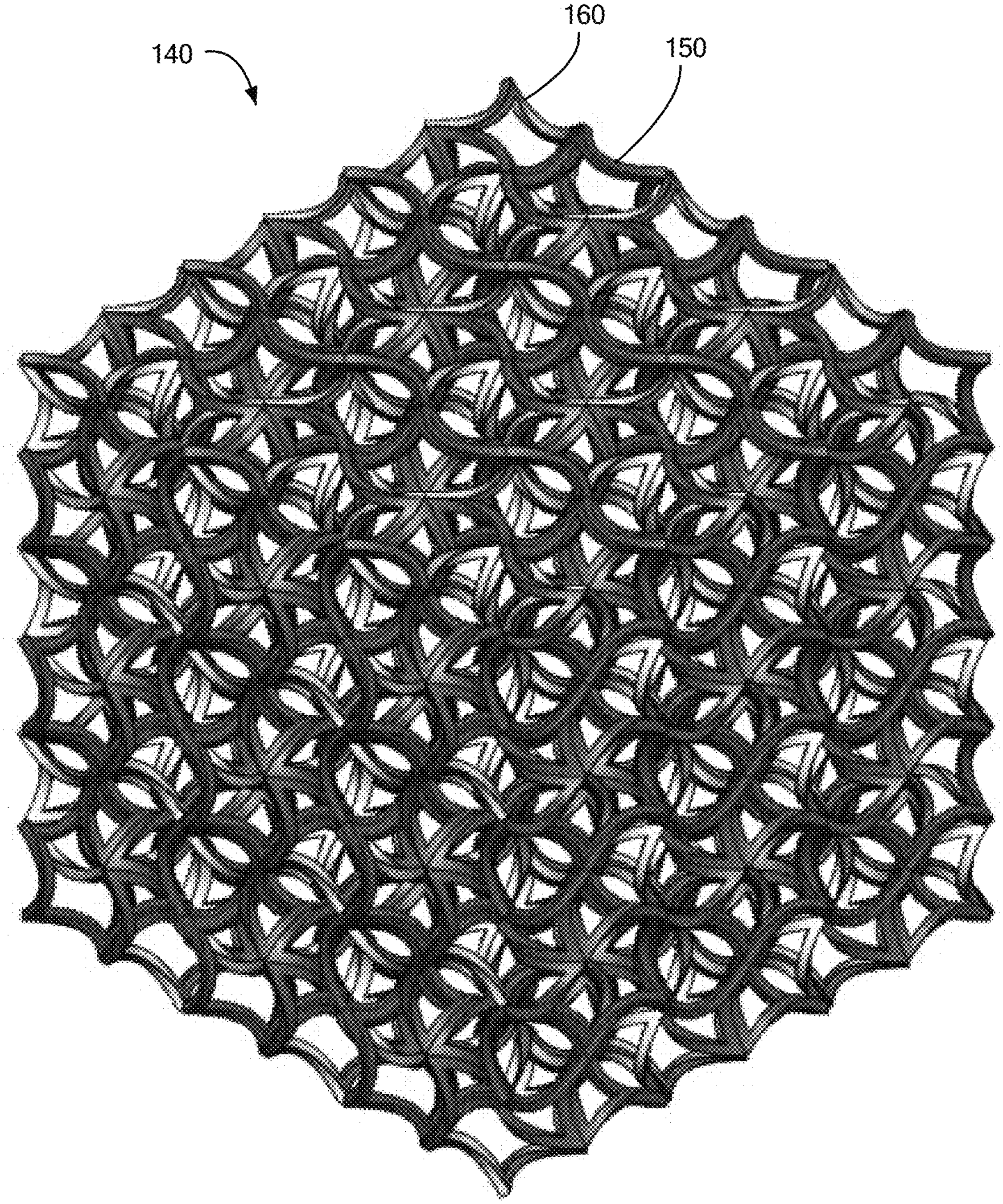
FIG. 2A is a color isometric view of an internal structure of an RF device formed from one or more RF tunable materials, according to one or more aspects of the present disclosure.
Figure 2B:
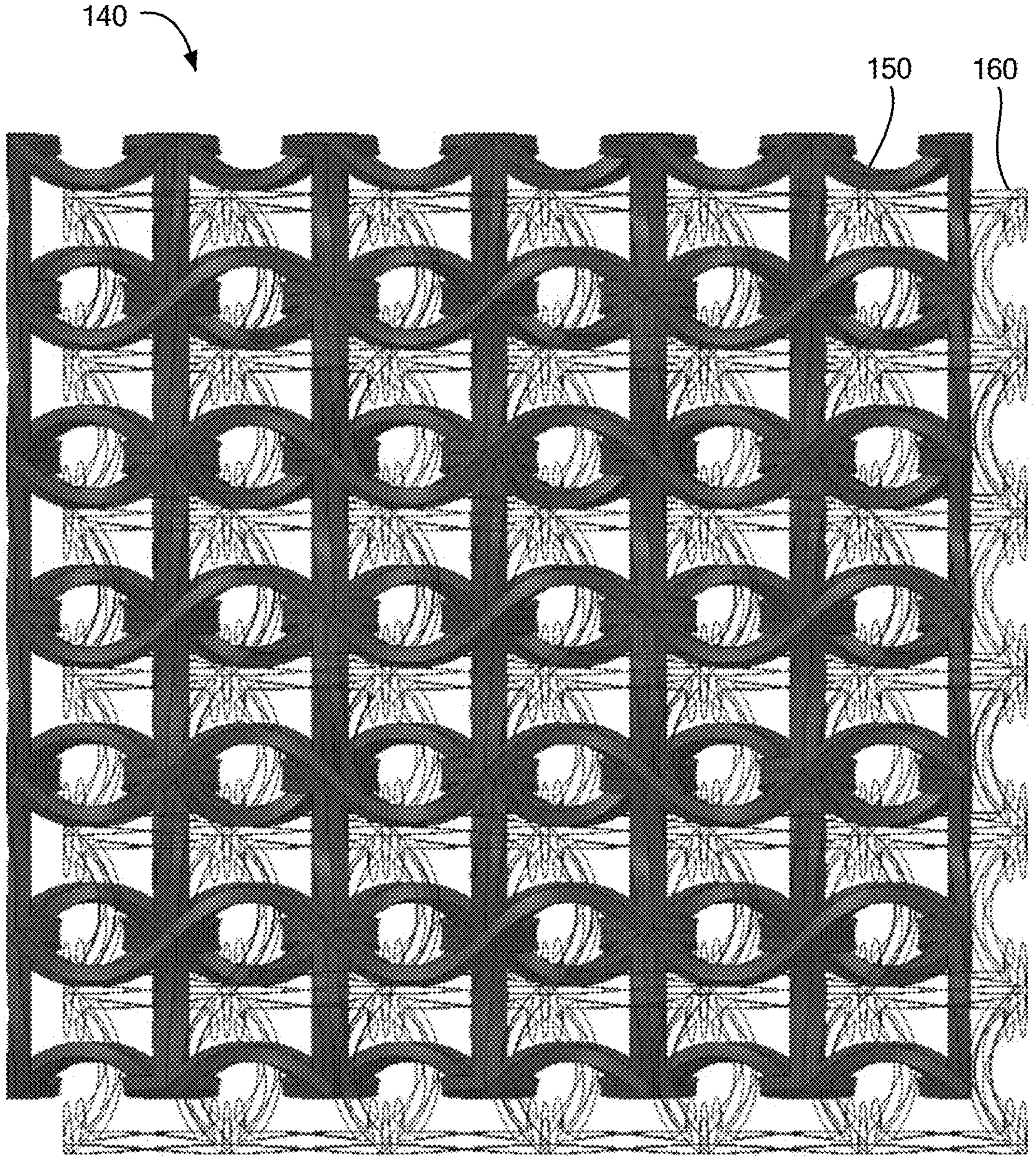
FIG. 2B is a side view of the internal structure of the RF device of FIG. 2A, according to one or more aspects of the present disclosure.

Turning now to FIGS. 2A-2B, an example internal structure 140 of an RF device, such as RF device 100 of FIGS. 1A, 1B, is shown. In embodiments, 3D printed RF devices may have an internal structure 140 corresponding to a double gyroid structure (i.e., a gyroid lattice) comprising two interpenetrating structures (or networks) 150,160 formed from one or more composite materials. A first network structure 150 and a second network structure 160 may be made out of different materials or may be the same material. In some embodiments, the structures 150, 160 may be formed from a gradient of materials. Combinations of materials, structures, and supplementary coatings and electronics may enable wide range tuneability. Different structures and locations of structures may be used to enable and enhance RF tunability. For example, such different structures may include but are not limited to pyramid structures, fractal structures, periodic cones, or the like.

Figure 2C:
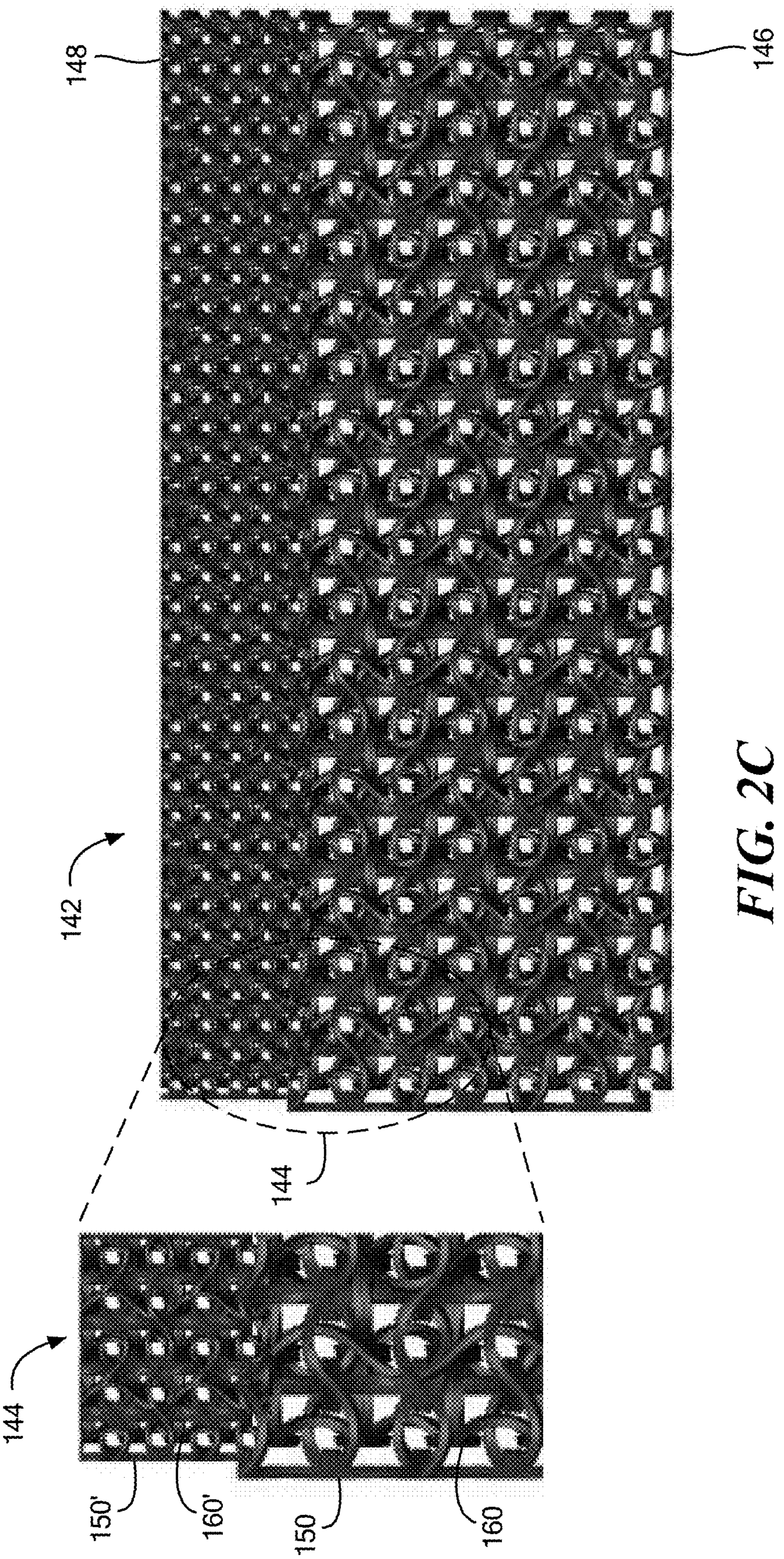
FIG. 2C is a color side view of a multi-layer RF device formed from one or more RF tunable materials, according to one or more aspects of the present disclosure.

Referring now to FIG. 2C, a multi-layer RF device 142 is shown including a first layer 146 and a second layer 148. According to one aspect, as seen in the expanded portion labeled as reference numeral 144, the first layer (e.g. lower) 146 may include a gyroid lattice formed from interpenetrating structures 150, 160. The second layer 148 may also include a gyroid lattice of two structures, such as network structures 150', 160', formed from one or more composite materials. The second layer 148, however, may be formed, using the various techniques concepts and methodologies described herein, in a tighter or more compact configuration. Accordingly, the RF tunability of the multi-layer RF device 142 can be designed using multiple layers of differently spaced, sized, or concentrated composite structures. While the example shown in FIG. 2C may include a first layer 146 and a second layer 148, one skilled in the art will recognize that additional layers may be formed to curate a multi-stack or multi-pattern tunable RF device.

In order to form the geometric shapes in an RF device, such as the RF device 100 of FIGS. 1A-1B, different formulations of the composite may be formed. According to one aspect, a formula for the composite forming the RF device may include performance material, resin, and an initiator, wherein the ratio of active material can vary to meet tunability requirements. More or less performance material may be included depending on the material's permeability and required RF tunable range. Resin may be used to form and lock in a structure of the performance material. In forming the formula, the amount of resin may be minimized to an amount needed to maximize active materials. Accordingly, the amount of resin used may match or otherwise relate to the amount of performance material used. The amount of initiator may be dependent on a resin cure pathway. In some embodiments, the resin may not require initiator, however with some resin chemistries, additional initiator may enable deeper cure depths. In some embodiments, the resin may be used to allow for multiple cures, as described herein. Resins with second, or supplemental cure, pathways may be used to enable deeper cures. Additional curing devices or methods may include, without limitation, UV cures, thermal cures, humidity cures, additional light and UV frequencies, radiation, applying a voltage, microwave curing, anaerobic curing, or any combination thereof.

In one embodiment, a formula for the RF device composite may include about 30% (+/−20%) performance material, about 69% resin (+/−10%), and about 1% (+/−5%) initiator. In another embodiment, the RF device composite may include includes about 35% resin, such as a bisphenol A glycidyl ether epoxy resin; about 27.5% of an additional resin, such as an acrylated bisphenol-A epoxy resin; about 12% Trimethylolpropane triacrylate; about 6% bismaleimide; about 18% 3-Glycidoxypropyltrimethoxysilane; and about 1.5% 4-Isopropyl-2,5-dioxoimidazolidine-1,3-di(propionodihydrazide); and, for the initiator, hydroxy cyclohexyl phenyl ketone.

Figure 3:
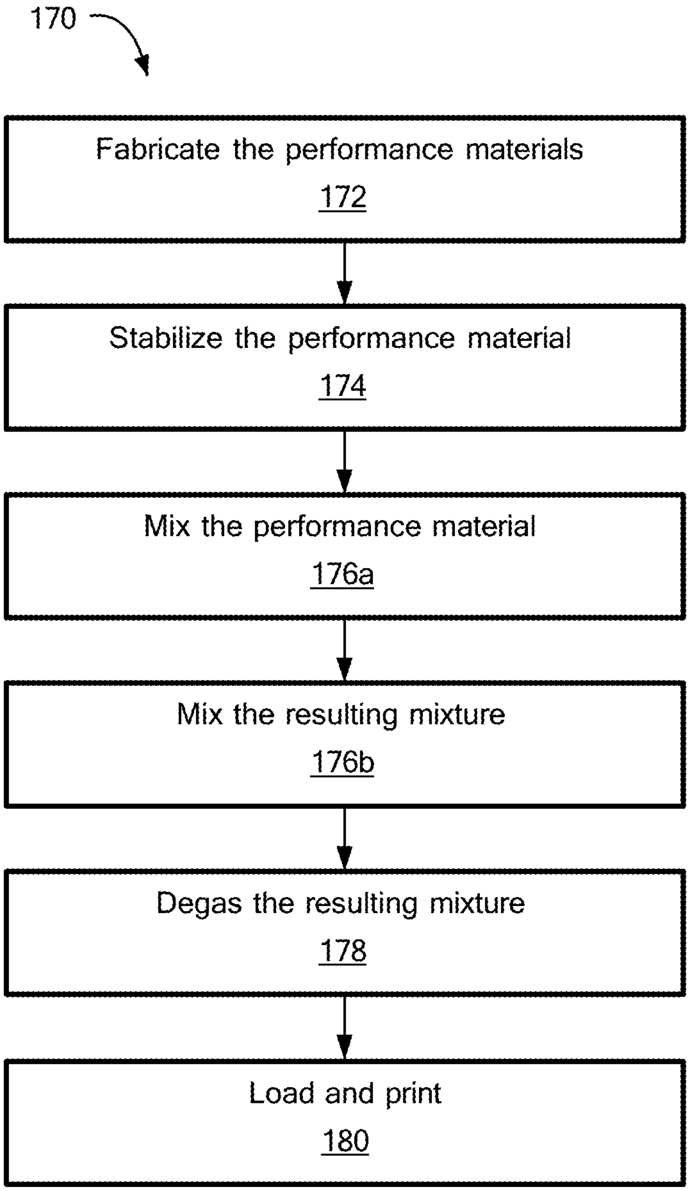
FIG. 3 is a flowchart of an example process to form an RF device, according to one or more aspects of the present disclosure.

Referring to FIG. 3, an example of a process 170 to form an RF device is shown. To form the composite, first, performance materials may be fabricated at the target size and aspect ratios, as shown in block 172. As shown in block 174, the performance materials may then be stabilized with a molecule that enhances scattering, for example by using tetraethyl orthosilicate. As shown in block 176*a*, performance materials may be mixed with resin materials and an initiator. The resulting mixture may be added to and mixed in a speed mixer, for example, shown in block 176*b*. Once mixed, the resulting mixture may be degassed under a full vacuum condition, shown in block 178. After degassing, as shown in block 180, the composite may be loaded into a 3D printer and used to form an RF device (e.g. any of the RF devices described herein).

According to one or more aspects, as described herein, after loading, the composite may be printed and cured. The composite may be cured during the printing process and then again in post processing if needed (e.g., a further thermal cure or sintering). In one embodiment, a primary cure is applied, then a supplemental cure, such as those described below in relation to FIGS. 4C-D. In some embodiments, both cures may be applied at the same time, or the supplemental cure may be applied first and the primary cure applied second.

In reference to FIGS. 4A-4D, a modified 3D printer system, generally referred to as 3D printer system 400, may be used to form an RF device, as disclosed herein. The system 400 may include a printer chamber 402 defining an internal cavity disposed about one or more printer nozzles 404. The printer nozzle 404 may form the RF composite or other materials onto a platform 406. According to one aspect, the system 400 may include a first spool 408 and a second spool 410 configured to hold and feed composite materials, such as composites 409, 411, to the nozzle 404, respectively. The system 400 may include one or more curing devices 412. According to one aspect, shown in the system 400*a* of FIG. 4A, the curing device 412 may include a first curing method 414, such as a UV cure, configured to cure the resulting structures extruded by the nozzle 404 onto the platform 406. The system 400*a* may be illustrated with the printer chamber having only sidewalls, however one skilled in the art will recognize that the system 400*a* may include additional walls, doors or other surfaces and on which curing devices 412 may be disposed and further configured to cure the extruded structures. For example, curing devices 412 may be disposed on all walls and doors of the chamber 402. Additionally, while only one nozzle 404 is shown in FIGS. 4A-D, one skilled in the art will recognize that multiple nozzles may be employed to facilitate or otherwise perform the printing process.

A controller 422 may be operatively connected to one or more of the nozzle 404, first spool 408, second spool 410, platform 406, and curing devices 412. According to one or more aspects, the controller may include or communicate with a computing device configured to drive the operation of the system 400. For example, the controller 422 may be programmed to cause the nozzle 404 to draw the composite materials from the spools 408, 410 and extrude the composite materials into the RF devices described herein. The controller may further be configured to operate the curing devices 412 to provide the appropriate curing method, intensity and duration. One skilled in the art will understand the configuration and operation of the controller in the context of the operation of the system 400.

Figure 4A:
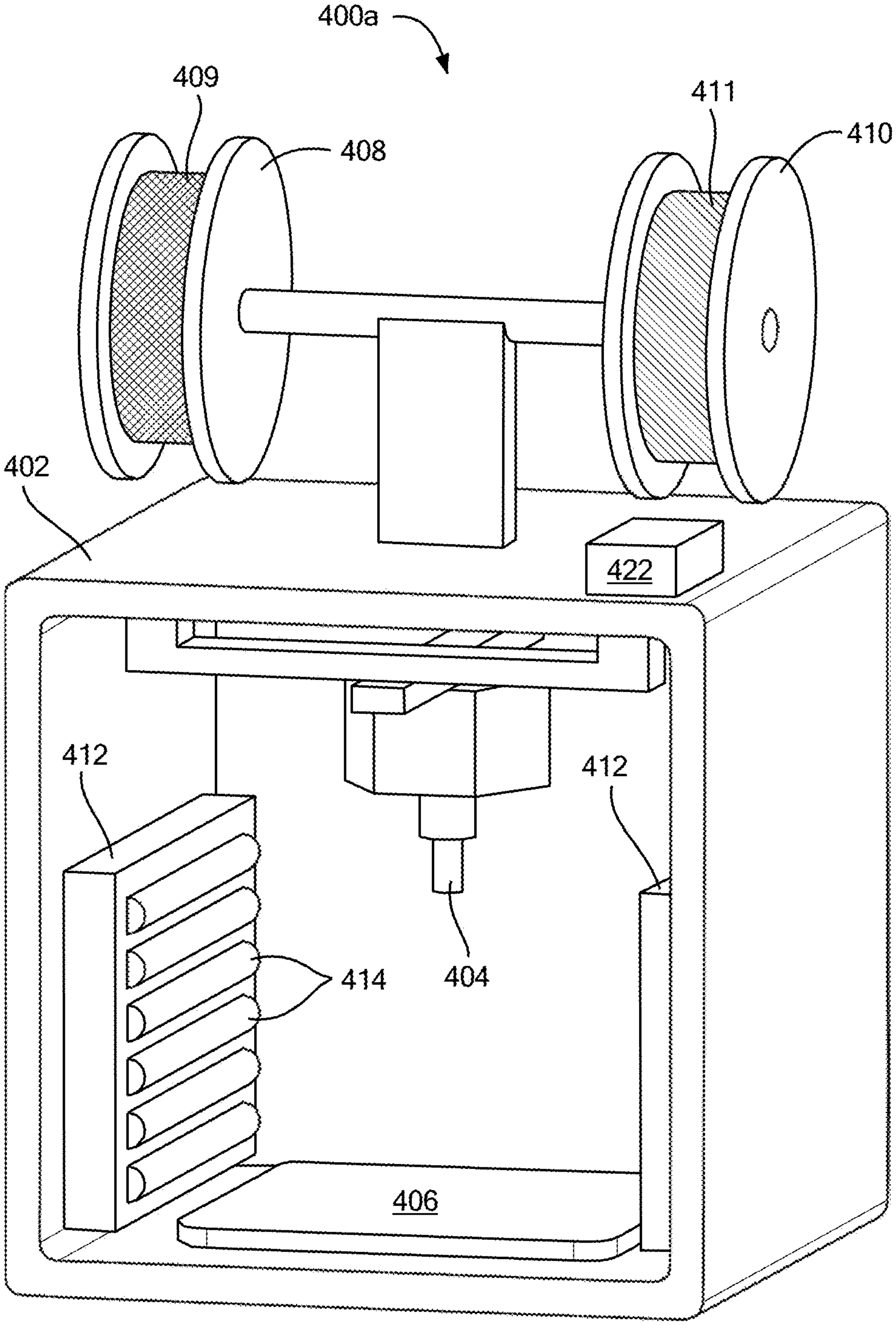
FIG. 4A is an isometric view of a system for three-dimensional (3D) printing of a RF device using RF tunable material, according to one or more aspects of the present disclosure.
Figure 4B:
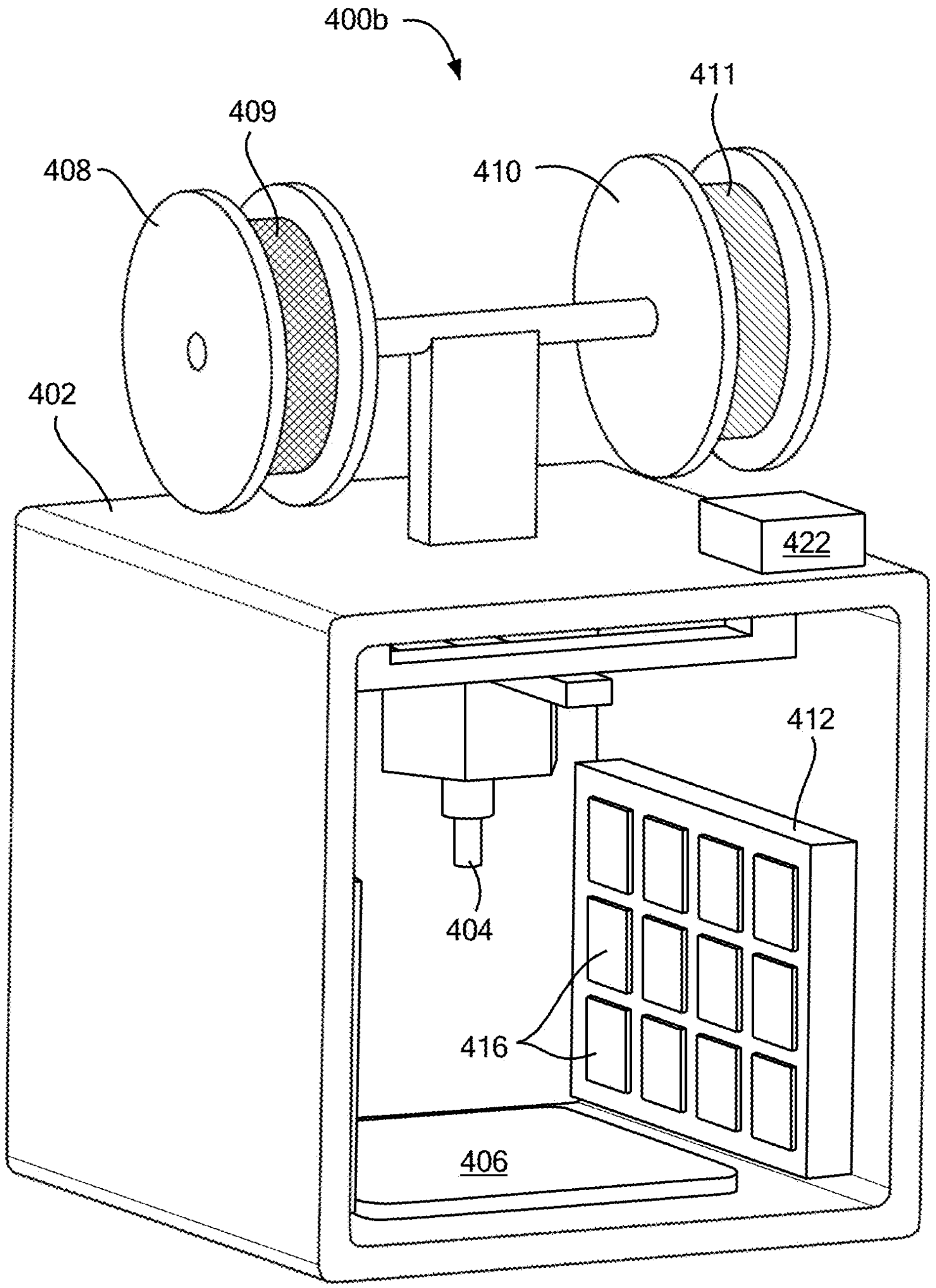
FIG. 4B is an isometric view of the three-dimensional (3D) printing system of FIG. 4A with an alternative curing device, according to one or more aspects of the present disclosure.
Figure 4C:
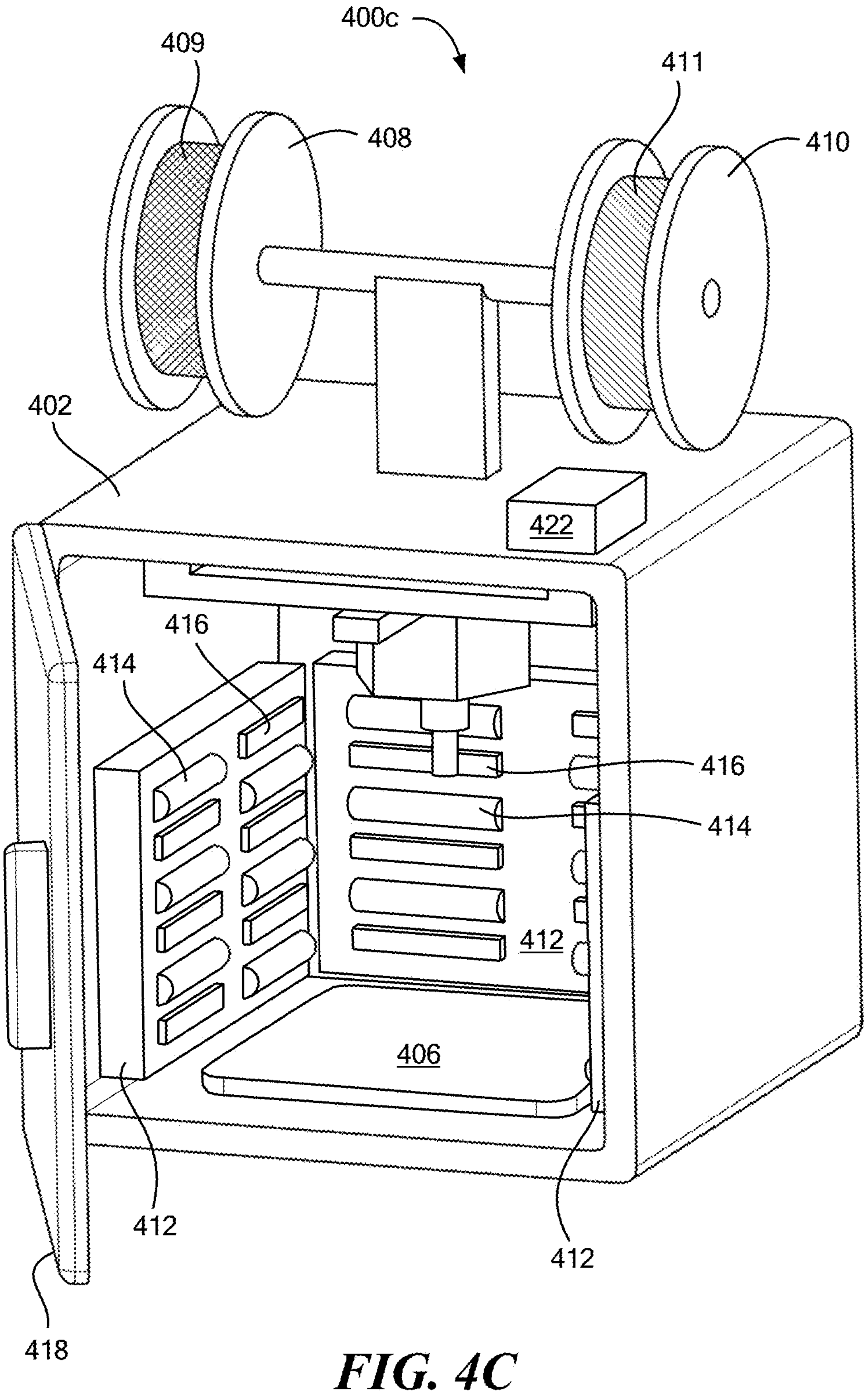
FIG. 4C is an isometric view of the three-dimensional (3D) printing system of FIG. 4A with multiple curing devices, according to one or more aspects of the present disclosure.

Alternatively, as shown by the system 400*b* of FIG. 4B (where like elements are referred to by like reference numerals), the curing device 412 may include a second curing method 416 which may include a thermal cure or other curing method. The system 400*b* may be illustrated with the printer chamber having sidewalls and a rear wall, however one skilled in the art will recognize that the system 400*b* may include additional walls, doors or other surfaces and on which curing devices 412 may be disposed and further configured to cure the extruded structures.

According to one or more aspects, the system 400 may curing devices 412 having two or more curing methods. As shown in the system 400*c* of FIG. 4C (where like elements are referred to by like reference numerals), a first (or primary) cure method 414 may include a UV cure. A second cure method 416 may include one or more mechanisms for implementing a supplemental cure method, including without limitation, thermal cures, humidity cures, additional light and UV frequencies cures, radiation cures, applied voltage cures, microwave cures, anaerobic cures, or the like.

According to one or more aspects of the disclosure, the curing devices 412, including one or both of the cure methods 412, 414, may be built into the cavity of the printer chamber 402. The first cure method 414 may be disposed along the entirety of the cavity, while the second cure method 416 may be disposed only in part or along certain areas of the cavity.

The system 400*c* may include a door 418 configured to seal the cavity of the printing chamber 402. While the system 400*c* is illustrated with the curing devices 412 disposed on the sidewalls and a rear wall, one skilled in the art will recognize that the system 400*c* may include additional curing devices 412 on the door 418 or other surfaces.

Figure 4D:
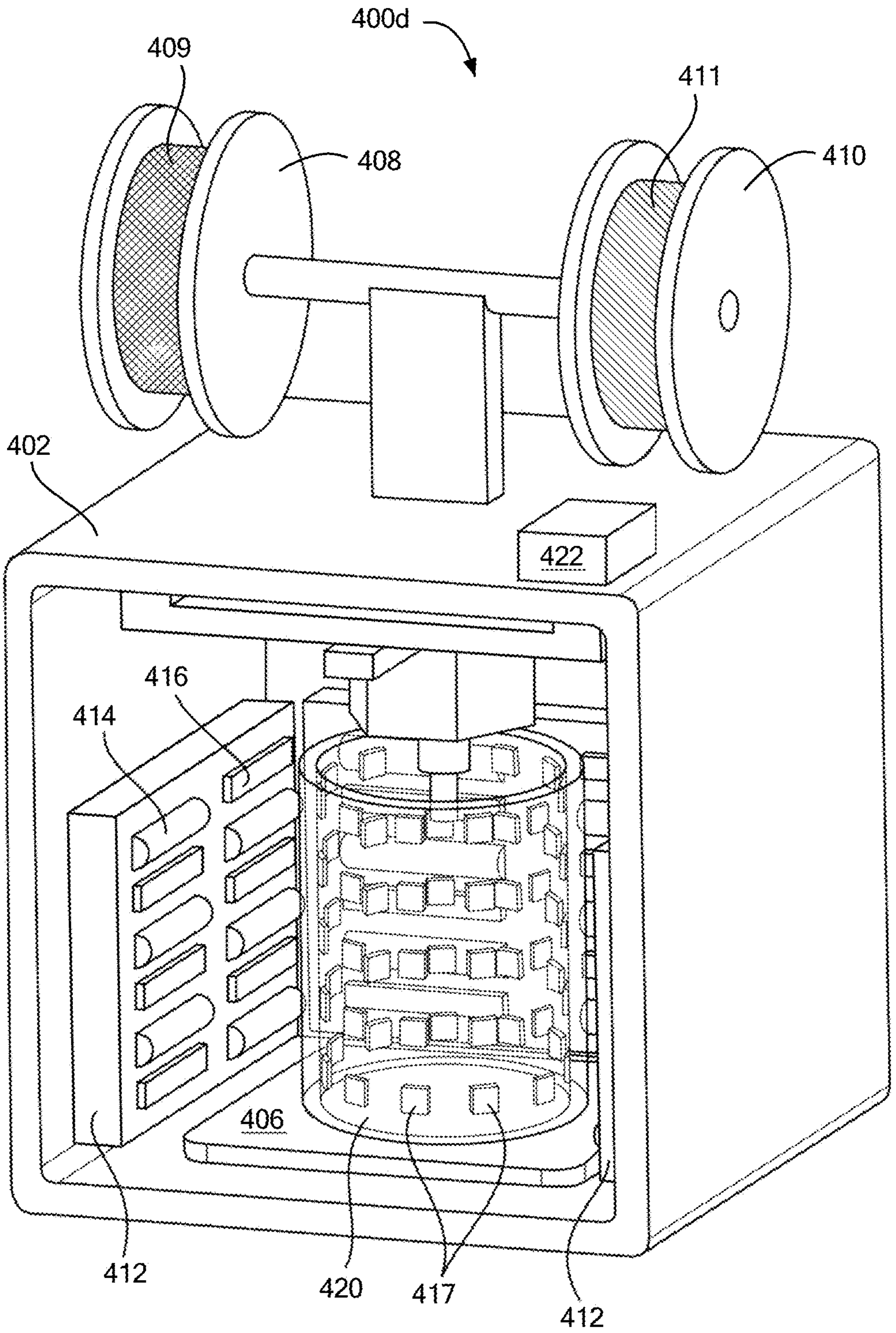
FIG. 4D is an isometric view of the three-dimensional (3D) printing system of FIG. 4A with an additional curing device, according to one or more aspects of the present disclosure.

In some embodiments, such as that shown in FIG. 4D (where like elements are referred to by like reference numerals), the two or more cure methods 414, 416 may include an enclosure 420. In embodiments, the enclosure 420 may be cylindrical and may be positioned inside of the cavity of the printer chamber 402 on the platform 406. The enclosure 420 may include a top surface (not shown) and may have an open bottom. The enclosure 420 may be positioned around the platform 406 and the printer nozzle 404.

According to one aspect, the positioning of the enclosure 420 may be selected in order to cure portions of the RF device. In some embodiments, the enclosure 420 may only be positioned around or covering some or all of the RF device. The enclosure may further include an enclosure curing method 417. In some embodiments, the enclosure curing method 417 may include the first cure method 414 or the second cure method 416, while the other cure method is positioned along the walls of the printer chamber 402. In some embodiments, the enclosure curing method 417 may include both the first cure method 414 and the second cure method 416. According to one aspect, the enclosure 420 may be moved up or down to adjust for varying curing processes. While the enclosure 420 is shown as a cylinder in FIG. 4D, one skilled in the art will recognize that the enclosure is not limited to just a cylindrical shape and could be any suitable shape. Additionally, the cylinder may include a top, a bottom, both a top and a bottom, or neither a top nor bottom.

According to one or more aspects, the first (or primary) cure method 414 may include a UV source. In embodiments, the UV source may be a UV signal having a wavelength in the range of about 360-440 nm (+/−20 nm) and more preferably in the range of about 385-415 nm (+/−20 nm). The second cure method may include a supplemental cure. The use of a primary cure method 414 in combination with one or more supplemental cure techniques may result in composites having a higher percentage of performance materials than may otherwise be achieved. That is, the use of both a primary cure technique and one or more supplemental cure techniques may allow for higher (e.g., about 30%+/−20%) loading of the resultant composite materials to be cured during the fabrication process).

The supplemental cure (e.g., the second cure method 416) may comprise supplemental cure resins and initiators, including but not limited to thermal cures, humidity cures, additional light and UV frequencies, radiation, applying a voltage, microwave curing, and/or anaerobic curing. One supplemental cure may be used, or a combination of supplemental cures may be used.

According to one aspect, additional light and UV frequencies may include a blue light signal source that is configured to emit a signal having a wavelength of about 470 nm (+/−20 nm). The thermal cures may include use of a thermal source, such as a heater, to thermally cure the RF tunable material. In embodiments, the thermal source may be configured to provide a thermal temperature in the range of about 100° C. (+/−20° C.) to about 160° C. (+/−30° C.). After reading the disclosure provided herein, one of ordinary skill in the art will appreciate how to select the temperatures at which to cure an RF device provided from a composite RF tunable material provided in accordance with the concepts described herein. The system 400 may also include a humidity control system configured to relative humidity to levels in the range of about 50%-95% (+/−5%). In some embodiments, humidity levels may be provided as a water port.

In some embodiments, the platform 406 may be heated. In some embodiments, the door 418 may be closed to further support the humidity cure or to contain light from the first or second cure method.

While the systems 400 described herein may include two or more curing methods, according to one aspect, if a material allows for a sufficient amount of UV scattering (for example through the use of additive materials) to enable higher loadings, only one curing device and/or method may be needed.

Figure 5:
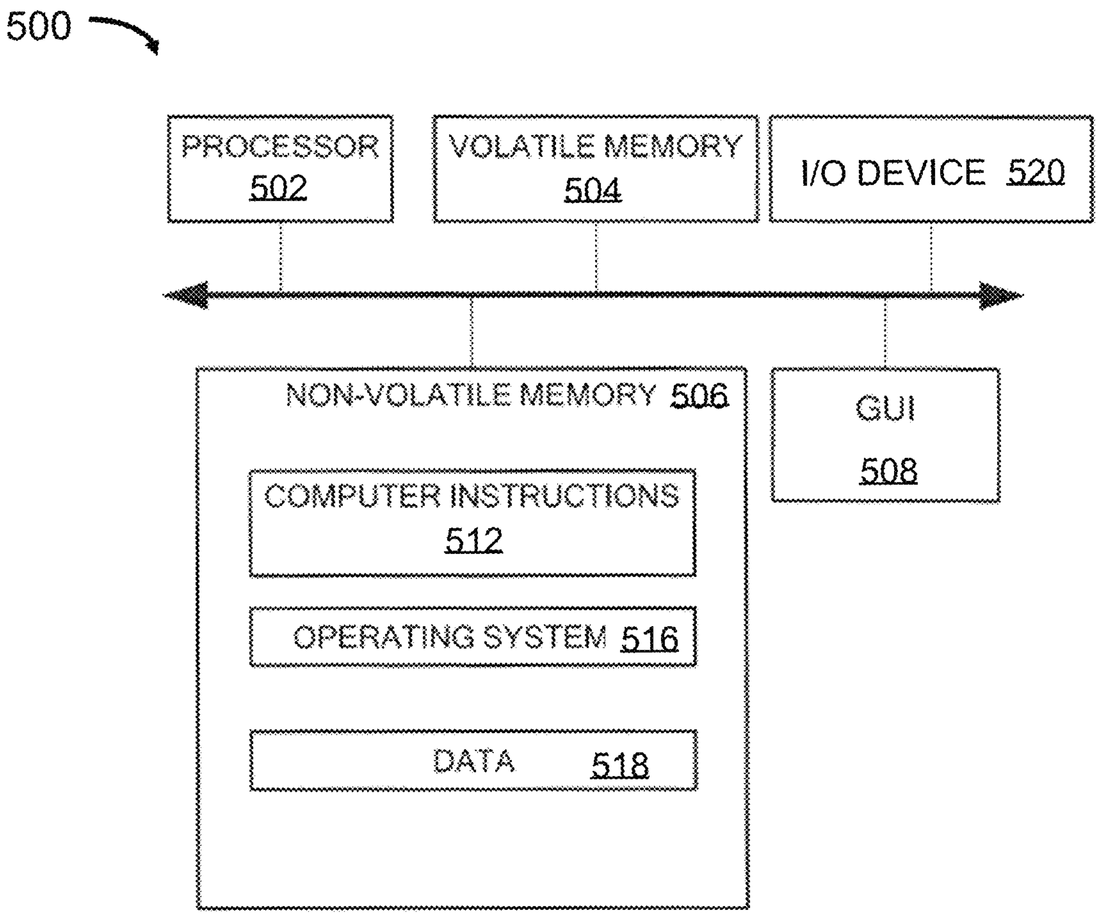
FIG. 5 is a diagram of an example of a computing device, according to one or more aspects of the present disclosure.

Referring to FIG. 5, in some embodiments, a controller or computing device 500 may be configured to drive or otherwise control the additive manufacturing systems described herein. The controller 500 may include processor 502, volatile memory 504 (e.g., RAM), non-volatile memory 506 (e.g., a hard disk drive, a solid-state drive such as a flash drive, a hybrid magnetic and solid-state drive, etc.), graphical user interface (GUI) 508 (e.g., a touchscreen, a display, and so forth) and input/output (I/O) device 520 (e.g., a mouse, a keyboard, etc.). Non-volatile memory 806 stores computer instructions 512, an operating system 816 and data 818 such that, for example, the computer instructions 512 are executed by the processor 502 out of volatile memory 504. Program code may be applied to data entered using an input device of GUI 508 or received from I/O device 520.

Various embodiments of the concepts, systems, devices, structures, and techniques sought to be protected are described herein with reference to the related drawings. Alternative embodiments can be devised without departing from the scope of the concepts, systems, devices, structures and techniques described herein. It is noted that various connections and positional relationships (e.g., over, below, adjacent, etc.) are set forth between elements in the following description and in the drawings. These connections and/or positional relationships, unless specified otherwise, can be direct or indirect, and the described concepts, systems, devices, structures and techniques are not intended to be limiting in this respect. Accordingly, a coupling of entities can refer to either a direct or an indirect coupling, and a positional relationship between entities can be a direct or indirect positional relationship.

As an example of an indirect positional relationship, references in the present description to forming layer "A" over layer "B" include situations in which one or more intermediate layers (e.g., layer "C") is between layer "A" and layer "B" as long as the relevant characteristics and functionalities of layer "A" and layer "B" are not substantially changed by the intermediate layer(s). The following definitions and abbreviations are to be used for the interpretation of the claims and the specification. As used herein, the terms "comprises," "comprising, "includes," "including," "has," "having," "contains" or "containing," or any other variation thereof, are intended to cover a non-exclusive inclusion. For example, a composition, a mixture, process, method, article, or apparatus that comprises a list of elements is not necessarily limited to only those elements but can include other elements not expressly listed or inherent to such composition, mixture, process, method, article, or apparatus.

Additionally, the term "exemplary" is used herein to mean "serving as an example, instance, or illustration. Any embodiment or design described herein as "exemplary" is not necessarily to be construed as preferred or advantageous over other embodiments or designs. The term "one or more" is understood to include any integer number greater than or equal to one, i.e., one, two, three, four, etc. The terms "a plurality" are understood to include any integer number greater than or equal to two, i.e., two, three, four, five, etc. The term "connection" can include an indirect "connection" and a direct "connection".

References in the specification to "one embodiment, "an embodiment," "an example embodiment," etc., indicate that the embodiment described can include a particular feature, structure, or characteristic, but every embodiment can include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described.

For purposes of the description hereinafter, the terms "upper," "lower," "right," "left," "vertical," "horizontal, "top," "bottom," and derivatives thereof shall relate to the described structures and methods, as oriented in the drawing figures. The terms "overlying," "atop," "on top, "positioned on" or "positioned atop" mean that a first element, such as a first structure, is present on a second element, such as a second structure, where intervening elements such as an interface structure can be present between the first element and the second element. The term "direct contact" means that a first element, such as a first structure, and a second element, such as a second structure, are connected without any intermediary conducting, insulating or semiconductor layers at the interface of the two elements.

Use of ordinal terms such as "first," "second," "third," etc., in the claims to modify a claim element does not by itself connote any priority, precedence, or order of one claim element over another or the temporal order in which acts of a method are performed, but are used merely as labels to distinguish one claim element having a certain name from another element having a same name (but for use of the ordinal term) to distinguish the claim elements.

The terms "approximately" and "about" may be used to mean within ±20% of a target value in some embodiments, within ±10% of a target value in some embodiments, within ±5% of a target value in some embodiments, and yet within ±2% of a target value in some embodiments. The terms "approximately" and "about" may include the target value. The term "substantially equal" may be used to refer to values that are within ±20% of one another in some embodiments, within ±10% of one another in some embodiments, within ±5% of one another in some embodiments, and yet within ±2% of one another in some embodiments.

The term "substantially" may be used to refer to values that are within ±20% of a comparative measure in some embodiments, within ±10% in some embodiments, within ±5% in some embodiments, and yet within ±2% in some embodiments. For example, a first direction that is "substantially" perpendicular to a second direction may refer to a first direction that is within ±20% of making a 90° angle with the second direction in some embodiments, within ±10% of making a 90° angle with the second direction in some embodiments, within ±5% of making a 90° angle with the second direction in some embodiments, and yet within ±2% of making a 90° angle with the second direction in some embodiments.

It is to be understood that the disclosed subject matter is not limited in its application to the details of construction and to the arrangements of the components set forth in the following description or illustrated in the drawings. The disclosed subject matter is capable of other embodiments and of being practiced and carried out in various ways. Also, it is to be understood that the phraseology and terminology employed herein are for the purpose of description and should not be regarded as limiting. As such, those skilled in the art will appreciate that the conception, upon which this disclosure is based, may readily be utilized as a basis for the designing of other structures, methods, and systems for carrying out the several purposes of the disclosed subject matter. Therefore, the claims should be regarded as including such equivalent constructions insofar as they do not depart from the spirit and scope of the disclosed subject matter.

Although the disclosed subject matter has been described and illustrated in the foregoing exemplary embodiments, it is understood that the present disclosure has been made only by way of example, and that numerous changes in the details of implementation of the disclosed subject matter may be made without departing from the spirit and scope of the disclosed subject matter.

What is claimed is:

1. A radio frequency (RF) device, comprising:

a first network structure comprising a first composite, the first composite including a first RF tunable material; and a second network structure interpenetrating the first network structure, the second network structure comprising a second composite including a second RF tunable material;

wherein the first and second network structures are sized and positioned to control an RF tuning ability, wherein each of the first composite and the second composite comprises one or more performance materials, and one or more additional additives, wherein the one or more performance materials are configured to change at least one of a dielectric material property, permeability, and electromagnetic response of the respective composite, and wherein the one or more additional additives are configured to enhance scattering of curing light.

2. The RF device of claim 1 wherein the first RF tunable material is the same as the second RF tunable material.

3. The RF device of claim 1 wherein the first network structure and the second network structure are equally sized and shaped.

4. The RF device of claim 1 wherein the first network structure and the second network structure each comprise gyroids.

5. The RF device of claim 4 wherein the first and second structures form a double gyroid lattice.

6. The RF device of claim 1, wherein the one or more performance materials comprise one or more of a ferroelectric additive, a ferromagnetic additive, a liquid crystal additive, a phase change additive, an elastic additive, a semiconductor material, and a semiconductor component.

7. The RF device of claim 6, wherein the one or more performance materials comprise one or more of barium strontium titanite (BST), yttrium iron garnet, gallium antimony tellurium (Ga—Sb—Te), and vanadium dioxide.

8. The RF device of claim 1, wherein the one or more additional additives comprise one or more of titanium dioxide, zinc oxide, oxides, nitrates, and nitrides.

9. The RF device of claim 8, wherein the one or more additional additives are sized between about 1 nanometer (nm) and 20 micrometers (μm).

10. The RF device of claim 1, wherein the first and second RF tunable materials include a spacing material positioned to modify a geometric shape of the RF device.

11. The RF device of claim 10, wherein the spacing materials comprise one of a magnetostrictive material and a piezoelectric material.

12. The RF device of claim 1 wherein a spacing between the first network structure and the second network structure is provided by an actuator.

13. The RF device of claim 1, wherein the first network structure and the second network structure define a gradient of structures along a height of the RF device, the gradient of structures comprising smaller structures positioned along a first side of the RF device and larger structures positioned along a second side of the RF device, wherein the smaller structures are configured to enable scanning at higher frequencies and the larger structures are configured to enable scanning at lower frequencies.

* * * * *